United States Patent [19]

Osato

[11] Patent Number: 5,536,570
[45] Date of Patent: Jul. 16, 1996

[54] OVERWRITE CAPABLE MAGNETO-OPTICAL RECORDING MEDIUM HAVING THREE MAGNETO-OPTIC LAYERS

[75] Inventor: Yoichi Osato, Yokohama, Japan

[73] Assignee: Canon Kabushiki Kaisha, Tokyo, Japan

[21] Appl. No.: 411,921

[22] Filed: Mar. 28, 1995

Related U.S. Application Data

[63] Continuation of Ser. No. 84,320, Jun. 30, 1993, abandoned, which is a continuation of Ser. No. 609,734, Nov. 6, 1990, abandoned.

[30] Foreign Application Priority Data

Nov. 10, 1989 [JP] Japan .................................... 1-291064

[51] Int. Cl.$^6$ ................................ G11B 5/66; B32B 5/16
[52] U.S. Cl. ................................ 428/336; 428/694 EC; 428/694 MM; 428/900; 369/13; 369/275.2; 369/275.3; 360/114; 365/122
[58] Field of Search ........................ 428/336, 694 EC, 428/694 MM, 900; 369/13, 275.2, 275.3; 360/114; 365/122

[56] References Cited

U.S. PATENT DOCUMENTS 4,664,977 5/1987 Osata et al. ........................ 428/336
4,675,767 6/1987 Osato et al. ........................ 360/131

FOREIGN PATENT DOCUMENTS 258978 3/1988 European Pat. Off. .
62-175948 8/1987 Japan .

*Primary Examiner*—Leszek Kiliman
*Attorney, Agent, or Firm*—Fitzpatrick, Cella, Harper & Scinto

[57] ABSTRACT

A magneto-optical recording medium capable of overwriting by light modulation comprises a substrate, a first magnetic layer having a curie point $T_1$ and a coercive force $H_1$, a second magnetic layer having a curie point $T_2$ and a coercive force $H_2$, and a third magnetic layer having a curie point $T_3$ and a coercive force $H_3$. The first, second and third magnetic layers are successively laminated on the substrate. The first magnetic layer, the second magnetic layer and the third magnetic layer each are vertically magnetized film composed chiefly of an amorphous alloy of rare earth elements and transition metal elements, and satisfy the following conditions:

$H_1 > H_2 > H_3$, $T_1 > T_2$ and $T_3$.

By constituting the magneto-optical recording medium as above, the external magnetic field can be reduced to thereby prevent the disappearance of the recording bit and to enable the compactness of a recording apparatus to be accomplished.

20 Claims, 3 Drawing Sheets

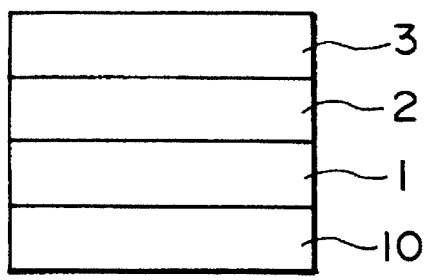
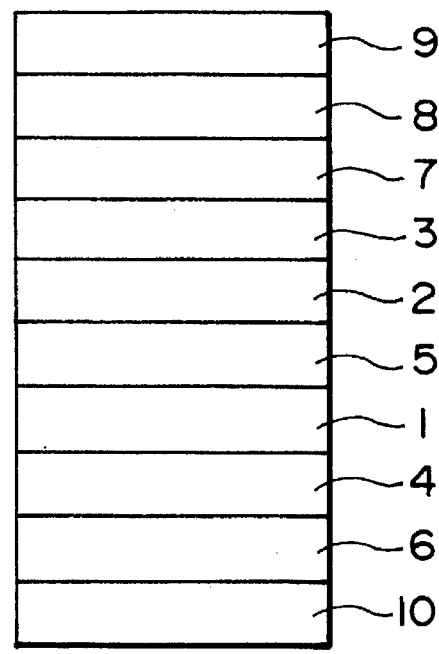
F I G. IA  F I G. IB

OVERWRITE CAPABLE MAGNETO-OPTICAL RECORDING MEDIUM HAVING THREE MAGNETO-OPTIC LAYERS

This application is a continuation of application Ser. No. 08/084,320 filed Jun. 30, 1993, which is a continuation of application Ser. No. 07/609,734 filed Nov. 6, 1990, both now abandoned.

BACKGROUND OF THE INVENTION

1. Field of the Invention

This invention relates to a magneto-optical recording medium which is capable of thermo-magnetic recording and from which recorded information can be read out by the utilization of the magnetic Kerr effect and which is further capable of overwriting.

2. Related Background Art

A magneto-optical memory is known as an erasable optical memory. This magneto-optical memory, as compared with a magnetic recording medium using a magnetic head, has the advantage that high density recording, recording and reproduction by non-contact, etc. are possible. However, to record information on such a magneto-optical memory, it has generally been necessary to erase (magnetize in one direction) the recorded portion before recording.

In order to mitigate the cumbersome nature of erasing before recording, there has been proposed a system in which recording and reproducing heads are discretely provided or a system in which recording is effected while applying a continuous laser beam and, at the same time, modulating the magnetic field applied. These recording systems, however, suffer from the disadvantage that the apparatus becomes large-scaled and costly or high-speed modulation is impossible.

Applicant has previously filed a patent application for a magneto-optical recording method capable of eliminating the disadvantage peculiar to the above-described recording systems and a magneto-optical recording medium suitable therefor (Japanese Laid-Open Patent Application No. 62-175948 or U.S. application Ser. No. 07/071190, now abandoned).

This recording method is a method which uses a magneto-optical recording medium having vertically magnetized film of two-layer structure, i.e., a first magnetic layer and a second magnetic layer (a recording auxiliary layer) and effects binary recording by the application of two kinds of laser powers from a recording head (and at the same time, the application of a bias magnetic field HB) and the application of a magnetic field at the other location than the head unit (hereinafter referred to as the external magnetic field $H_E$). The binary recording bit comprises (i) a bit in which the direction of magnetization of the first magnetic layer is oriented in a direction stable relative to the direction of magnetization of the second magnetic layer, and (ii) a bit in which the direction of magnetization of the first magnetic layer is oriented in a direction not stable relative to the direction of magnetization of the second magnetic layer.

This recording method can be carried out by a relatively compact recording-reproducing apparatus of relatively simple construction. Further, the method is a useful technique from the viewpoints that high-speed modulation is possible and overwriting similar to that achieved by a magnetic recording medium is also possible.

Where such a prior-art magneto-optical recording medium proposed by the applicant is used, an external magnetic field $H_E$ usually of the order of 5 KOe or more has been necessary. It has sometimes been the case that the recording bit disappears due to the application of such a relatively great external magnetic field $H_E$. Also, a device for generating the external magnetic field $H_E$ has hampered the attempt to make the entire recording apparatus more compact.

SUMMARY OF THE INVENTION

It is the object of the present invention to provide a magneto-optical recording medium which can accomplish as good overwriting as that in the prior art even if the external magnetic field $H_E$ is relatively small and which can prevent the disappearance of the recording bit by a reduction in the external magnetic field $H_E$ and enables further compactness of a recording apparatus to be accomplished.

Applicant has repeatedly studied a means to achieve the above object and as a result, has found that it is very effective to make the magnetic layer of a magneto-optical recording medium into a particular three-layer construction.

That is, the present invention is a magneto-optical recording medium comprising a first magnetic layer having a curie point $T_1$ and a coercive force $H_1$, a second magnetic layer having a curie point $T_2$ and a coercive force $H_2$, and a third magnetic layer having a curie point $T_3$ and a coercive force $H_3$, where said first, second and third magnetic layers being successively laminated on a substrate. Further, said first magnetic layer, said second magnetic layer and said third magnetic layer each being vertically magnetized film composed chiefly of an amorphous alloy of rare earth elements and transition metal elements, and satisfying the following conditions:

$H_1 > H_2 > H_3$, $T_1 < T_2$ and $T_3$.

The prior-art magneto-optical recording medium described in Japanese Laid-Open Patent Application No. 62-175948 (U.S. application Ser. No. 071190, now abandoned) has a first magnetic layer and a second magnetic layer, as previously described, whereas the magneto-optical recording medium of the present invention further has a third magnetic layer lower in coercive force than the second magnetic layer. A further reduction in the external magnetic field becomes possible primarily due to by the action presented by the third magnetic layer. At the same time, a good recording-reproducing characteristic similar to that of the prior art is provided by the actions mutually presented by the first magnetic layer, the second magnetic layer and the third magnetic layer. That is, the object of the present invention can be achieved by the actions presented by the respective layers being coupled with one another.

BRIEF DESCRIPTION OF THE DRAWINGS

FIGS. 1A and 1B are schematic cross-sectional views illustrating showing the constructions of the magneto-optical recording mediums of the present invention.

DETAILED DESCRIPTION OF THE PREFERRED EMBODIMENTS

Figure 2:
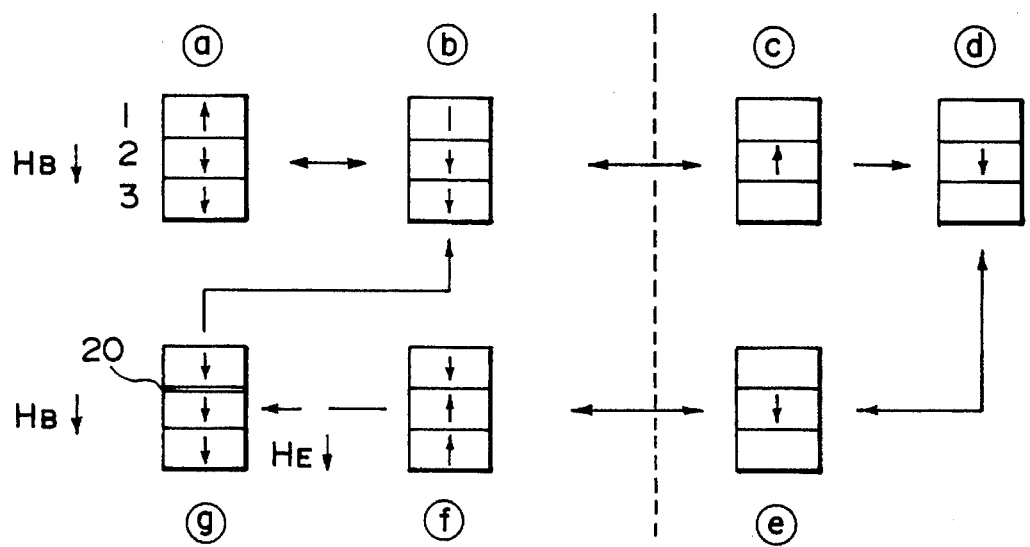
FIGS. 2 and 4 are schematic views illustratively showing the magnetized states of the magneto-optical recording mediums of the present invention in the recording process.

The present invention will hereinafter be described in detail with reference to the drawings.

FIG. 1A is a schematic cross-sectional view showing an example of the layer construction of the magneto-optical recording medium of the present invention. This magneto-optical recording medium is one in which a first magnetic layer 1, a second magnetic layer 2 and a third magnetic layer 3 are successively laminated on a light-transmitting substrate 10 provided with a pregroove. Each magnetic layer comprises vertically magnetized film composed chiefly of an amorphous alloy of a rare earth element and a transition metal element. Also, the first magnetic layer 1 and the second magnetic layer 2, and the second magnetic layer and the third magnetic layer 3 are exchange-coupled to each other.

The magneto-optical recording medium of the present invention shown in FIG. 1B is a medium further having a magnetic layer 4 of good reproducing characteristic, a magnetic layer 5 for controlling the magnitude of the exchange coupling between the first magnetic layer and the second magnetic layer, protective layers 6 and 7 for improving the durability and magneto-optical effect of each magnetic layer, an adhesive layer 8 and a substrate 9 for cementing. If layers similar to the layers 1 through 7 are further provided on the substrate 9 for cementing with the adhesive layer interposed therebetween, there will be provided a magneto-optical recording medium capable of recording and reproduction on the front and back surfaces thereof.

The first magnetic layer and the second magnetic layer in the present invention satisfy the relation that $$H_1 > H_2 > \frac{\delta w}{2 M_s h},$$

where $H_1$ is the coercive force of the first magnetic layer, $H_2$ is the coercive force of the second magnetic layer, $M_s$ is the saturated magnetization of the second magnetic layer, h is the film thickness of the second magnetic layer, and $\delta w$ is the magnetic wall energy between the first magnetic layer and the second magnetic layer. (For details, see Japanese Laid-Open Patent Application No. 62-175948 (U.S. application Ser. No. 071190).) Further, the first magnetic layer, the second magnetic layer and the third magnetic layer satisfy the following conditions:

$H_1 > H_2 > H_3$ $T_1 < T_2$ and $T_3$ where $H_1$ and $T_1$ are the coercive force and the curie point, respectively, of the first magnetic layer, $H_2$ and $T_2$ are the coercive force and the curie point, respectively, of the second magnetic layer, and $H_3$ and $T_3$ are the coercive force and the curie point, respectively, of the third magnetic layer.

The curie points and coercive forces of the respective magnetic layers in the present invention should only satisfy the aforementioned conditions, and the optimum values thereof differ depending on various conditions and therefore cannot be absolutely said. However, the curie point $T_1$ of the first magnetic layer may desirably be of the order of 70° C.–250° C., and preferably be of the order of 100° C.–200° C. The coercive force $H_1$ of the first magnetic layer may desirably be 5 KOe or more, and preferably be 10 KOe or more. The curie point $T_2$ of the second magnetic layer may desirably be of the order of 100° C.–400° C., and preferably be of the order of 150° C.–250° C. The coercive force $H_2$ of the second magnetic layer may desirably be of the order of 0.3 KOe–5 KOe, and preferably be of the order of 0.5 KOe–2 KOe. The curie point $T_3$ of the third magnetic layer may desirably be of the order of 100° C.–400° C., and preferably be of the order of 120° C.–200° C. The coercive force $H_3$ of the third magnetic layer may desirably be of the order of 0.1 KOe–5 KOe, and preferably be of the order of 0.3 KOe–1 KOe. The film thickness of the first magnetic layer may desirably be of the order of 200 Å–1000 Å, and preferably be of the order of 300 Å–500 Å. The film thicknesses of the second and third magnetic layers may desirably be of the order of 200 Å–2000 Å, and preferably be of the order of 300 Å–800 Å.

Also, each magnetic layer is composed chiefly of an amorphous alloy of rare earth elements and transition metal elements, and may desirably contain e.g. 50 atom % or more, and preferably contain 70 atom % or more, such an amorphous alloy usually exhibits vertical magnetism anisotropy and presents a relatively great magneto-optical effect and therefore is suitable for the present invention. Also, the rare earth elements contained in the second magnetic layer may preferably be chiefly Tb and/or Dy, and the rare earth elements contained in the third magnetic layer may preferably be chiefly Gd and/or Ho. Specific examples of amorphous magnetic alloys suitable for constituting the respective magnetic layers (vertically magnetized films) are mentioned below.

As the material forming the first magnetic layer, mention may be made of Tb—Fe, Tb—Dy—Fe, Dy—Fe, Tb—Fe—Co, Tb—Dy—Fe—Co, Dy—Fe—Co or the like.

As the material forming the second magnetic layer, mention may be made of Tb—Fe, Tb—Dy—Fe, Dy—Fe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co, Gd—Dy—Fe—Co or the like.

As the material forming the third magnetic layer, mention may be made of Gd—Tb—Fe, Gd—Tb—Dy—Fe, Gd—Dy—Fe, Ho—Gd—Fe, Gd—Tb—Fe—Co, Gd—Tb—Dy—Fe—Co, Gd—Dy—Fe—Co, Ho—Gd—Fe—Co or the like.

In the present invention, the second magnetic layer and/or the third magnetic layer may be a magnetic layer having a compensation temperature between room temperature and the curie point, or may be a magnetic layer having no compensation temperature. Also, where the magnetic layer has a compensation temperature, the compensation temperature may desirably be of the order of 50°–300° C., and preferably be of the order of 70°–200° C.

The magneto-optical recording medium of the present invention is not limited to one having only said substrate and said three kinds of magnetic layers. For example, as shown in FIG. 1B, a desired layer can be provided between the substrate and the magnetic layers or on the magnetic layers. The desired layer or layers is a suitable dielectric material layer or reflecting layer provided, for example, the purposes of improving durability and improving the magneto-optical effect for the sensitivity of recording or erasing.

Magnetic layers of good reproducing characteristic (magnetic layers having a great magnetic Kerr effect) can also be laminated on the side on which the information of the first magnetic layer is read out. The side on which the information is read out usually means the transparent substrate side.

Also, a suitable magnetic or non-magnetic layer for controlling the magnitude of exchange coupling may be interposed between the first magnetic layer and the second magnetic layer.

A method of effecting recording on the magneto-optical recording medium of the present invention will now be described with reference to the drawings.

FIG. 2 is a schematic view illustratively showing the magnetized states ⓐ–ⓖ of the magnetic layers in the recording process of the magneto-optical recording medium of the present invention. In this figure, the arrows (↑ or ↓) in the first magnetic layer 1, the second magnetic layer 2 and the third magnetic layer 3 schematically represent the directions of magnetization in the respective magnetic layers. Also, the arrows (←→) among the magnetized states ⓐ–ⓖ shows that the process is a reversible process relative to temperature, and the arrow (← or →) shows that the process is a non-reversible process.

The example shown in FIG. 2 shows a case where the first magnetic layer is rare earth-iron group amorphous alloy thin film in which iron group sub-lattice magnetization is dominant and the second and third magnetic layers each are rare earth-iron group amorphous alloy thin film in which rare earth sub-lattice magnetization is dominant. In this case, due to the mutual exchange action among the layers, the magnetization of the first magnetic layer and the second magnetic layer is stable in an anti-parallel state, while the magnetization of the second magnetic layer and the third magnetic layer is stable in a parallel state. That is, the magnetized state ⓐ is the most stable state. On the other hand, the state ⓖ is unstable as compared with the state ⓐ, and as shown, an interface magnetic wall 20 exists in this state.

Figure 3:
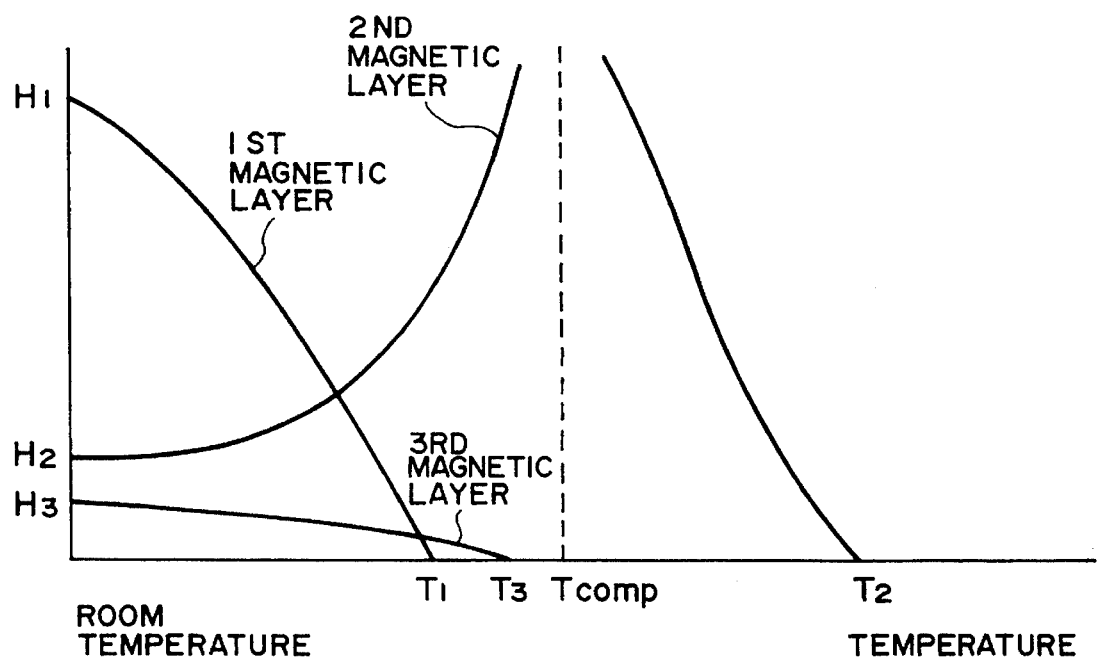
FIGS. 3 and 5 are graphs showing the relations between the coercive forces and temperatures in the first to third magnetic layers of the magneto-optical recording mediums of the present invention.

The relations between the coercive forces of the respective magnetic layers and temperature in this case are shown in FIG. 3. FIG. 2 shows the states uniformly along the temperature axis of FIG. 3. That is, states ⓐ and ⓖ shown in FIG. 2 are the magnetized states at room temperature, and as shift is made rightwardly to states ⓑ, ⓒ and ⓓ, temperature is elevated above room temperature.

When this magneto-optical recording medium is raised in temperature to the vicinity of $T_1$ shown in FIG. 3, the portion of the medium which is in the magnetized state ⓖ assumes the state ⓑ. This is because the coercive force $H_1$ of the first magnetic layer is reduced with the rise in temperature and is upwardly reversed under the influence of the exchange force by the second and third magnetic layer. If the temperature is lowered from this state, the medium will cool down and shift to the state ⓐ while the magnetized state remains unchanged. Also, if the temperature is raised from the state ⓐ and is lowered after the state ⓑ is assumed, the medium will retain the magnetization of state ⓐ.

That is, by the application of laser power for raising the temperature of the magnetic layers to the vicinity of $T_1$, both of the states ⓐ and ⓖ in the medium can be changed to the state ⓐ.

On the other hand, if the magnetic layers are further raised in temperature from the state ⓑ and are brought into the state ⓒ which exceeds the compensation temperature $T_{comp}$ of the second magnetic layer, the magnetization of the second magnetic layer will be reversibly inverted. If the temperature is further raised, the coercive force of the second magnetic layer will become small and the magnetization of the second magnetic layer will be again inverted by a bias magnetic field $H_B$ and the state ⓓ will be assumed. Also, at these temperatures, the first and third magnetic layers exceed their respective curie-point and therefore the magnetization of these layers disappears.

If the temperature is lowered from this state, the medium will cool down and assume the state ⓔ while the magnetized state remains unchanged. If the temperature is further lowered, the magnetization of the second magnetic layer will be reversibly inverted in the vicinity of $T_{comp}$, and by virtue of the exchange co-action of the second magnetic layer, the magnetization of the first magnetic layer will arise downwardly and the magnetization of the third magnetic layer will arise upwardly, with a result that the state ⓕ will be assumed. If the temperature is further lowered to room temperature, the coercive force of the second magnetic layer will become small and the coercive force of the first magnetic layer will become great. If the external magnetic field $H_E$ is applied hereupon, the magnetization of the second and third magnetic layers will be downwardly inverted and assume the state ⓖ.

That is, by the application of laser power for raising the temperature of the magnetic layers to the vicinity of $T_2$ (and the application of the external magnetic field $H_E$), both of the state ⓐ and the state ⓖ shift to the state ⓖ.

By the recording method in which the two kinds of laser powers as illustratively shown above are applied, the overwriting of binary record of ⓐ and ⓖ can be carried out.

In this recording method, the bias magnetic field $H_B$ is applied in the recording head portion (the region to which the laser powers are applied), and the external magnetic field $H_E$ (initializing magnetic field) of a magnitude sufficient to magnetize the second magnetic layer of coercive force $H_2$ and the third magnetic layer of coercive force $H_3$ in one direction and not inverting the direction of magnetization of the first magnetic layer is applied at a position different from the recording head. Here, $H_B$ is smaller than $H_E$.

If in such a recording method, an external magnetic field $H_E$ of relatively great magnitude (5 KOe or more) is imparted to the recorded bit information ⓐ and ⓕ), noise tends to increase during reproduction and an error is likely to occur. In the present invention, however, even if the external magnetic field $H_E$ is 3 KOe or less, or in some cases, 0.5 KOe or less, good inversion of ⓕ→ⓖ is possible and therefore, such a tendency is reduced.

Also, for example, to impart an external magnetic field $H_E$ of 3 KOe or more from an electromagnet disposed at a location spaced apart by several millimeters from the substrate of the medium, an electromagnet device of a size as large as a tobacco case becomes necessary, but in the present invention, the external magnetic field $H_E$ may be low as described above and therefore, further compactness of the apparatus and a further reduction in consumed electric power become possible.

Also, in the recording process shown in FIG. 2, the external magnetic field $H_E$ and the bias magnetic field $H_B$ are in the same direction. Accordingly, recording can be effected when the bias magnetic field $H_B$ is applied in such a direction without inversion of the magnetization of the second and third magnetic layers in the recording bit ⓖ, which is in an unstable state. Therefore, margins can be allowed for when designing the magnitude of the bias magnetic field $H_B$ and the coercive forces and thicknesses of the magnetic layers of the medium.

Various examples of data to which I have referred until the completion of the present invention will now be generally described to thereby state the action of the present invention clearly.

In the magneto-optical recording medium, it is desirable that the second magnetic layer having a compensation temperature $T_{comp}$ between room temperature and the curie point be of a composition in which rare earth sub-lattice magnetization is dominant, but the obtained compensation temperature $T_{comp}$ varies greatly depending on both of the composition ratio between rare earth elements and iron group elements and the kinds of the rare earth elements used (Tb, Dy, Gd, Ho and Nd).

For example, in the composition area in which rare earth sub-lattice magnetization is dominant, let it be assumed that in the case of the kinds of rare earth elements and iron group elements and a case where respective ones of them are two or more kinds of alloys, the ratio of the elements of the respective groups is not changed, but only the composition ratio between rare earth elements and iron group elements is varied. As the proportion of the rare earth elements is increased in that manner to reduce the coercive force, the compensation temperature of the alloy film rises. When the coercive force is reduced to a certain level or below, the compensation temperature will exceed the curie point and no the magnetization will no longer appear. Therefore, the coercive force (the limit coercive force) varies greatly depending on the kinds of rare earth elements employed.

For example, comparing alloy films in which the kinds of rare earth elements have been changed and the curie point has been adjusted to about 200°–250° C. depending on the composition ratio of Fe—Co, as shown in Table 1 below, the limit coercive forces of alloys of rare earth elements in which the vertical magnetic anisotropy is greater are greater.

TABLE 1

| Alloy film | Limit coercive force |
| --- | --- |
| Tb—($Fe_{85}Co_{15}$) | 4 KOe |
| Dy—($Fe_{78}Co_{22}$) | 3 KOe |
| Ho—($Fe_{60}Co_{40}$) | 1 KOe |
| Gd—Fe | 0.5 KOe |

Regarding a medium in which the composition ratios between the rare earth elements and the iron group elements of the alloy films of Table 1 have been adjusted so that the coercive force may be approximately 4 KOe and $Si_3N_4$ film, said alloy film and $Si_3N_4$ film have been laminated to 600 Å, 800 Å and 600 Å, respectively, on a disk substrate and which has been obtained by sputtering this construction, the C/N ratios and recording noises are shown in Table 2 below.

TABLE 2

| Alloy film | C/N ratio | Recording noise |
| --- | --- | --- |
| Tb—($Fe_{85}Co_{15}$) | 55 dB | −55 dBm |
| Dy—($Fe_{78}Co_{22}$) | 53 dB | −53 dBm |
| Ho—($Fe_{60}Co_{40}$) | 45 dB | −47 dBm |
| Gd—Fe | 38 dB | −40 dBm |

The C/N ratios and recording noises in Table 2 above are the results obtained by rotating the respective mediums at a line speed of 9 m/sec., effecting recording by a light beam of 8 mW modulated at 50% duty and 2 MHz, and effecting reproduction by a continuous beam of 1 mW.

As is apparent from the results shown in Table 2, even in the case of alloy films adjusted to the same coercive force, the use of rare earth elements such as Tb and Dy which are greater in vertical magnetic anisotropy can reduce the recording noise and can obtain a good reproduction C/N ratio. Accordingly, from the viewpoint of the recording characteristic, it is desirable to use Tb—Fe—Co or Dy—Fe—Co alloy film as the second magnetic layer, but as can be seen from Table 1 above, it is difficult to make the coercive forces of these alloy films small in a state in which they have a compensation temperature between room temperature and the curie point and therefore, a relatively great external magnetic field $H_E$ is necessary.

Further, even in mediums using the same rare earth element-iron group alloy thin film, the reproduction C/N ratio and recording noise thereof will vary if the coercive forces of the alloys differ from each other. Some examples of this are shown in Table 3 below. The constructions of the mediums and the conditions of recording and reproduction shown in this Table are the same as those shown in Table 2.

TABLE 3

| Alloy film | Tb—($Fe_{85}Co_{15}$) | | Gd—Fe | |
| --- | --- | --- | --- | --- |
| Recording characteristic | C/N ratio | Recording noise | C/N ratio | Recording noise |
| Coercive force | | | | |
| 10 KOe | 55 dB | −55 dBm | 42 dB | −44 dBm |
| 5 KOe | 55 dB | −55 dBm | 39 dB | −41 dBm |
| 2 KOe | 53 dB | −53 dBm | 37 dB | −39 dBm |
| 0.7 KOe | 45 dB | −45 dBm | 33 dB | −37 dBm |

That is, Applicant has carried out studies and experiments repeatedly while taking these data into account and as a result, has found that the objectives of the present invention are achieved by use of a second magnetic layer having such a degree of coercive force that can present a good recording characteristic and a third magnetic layer of a smaller coercive force, which is exchange-coupled to and laminated on said second magnetic layer, thereby providing a medium good in recording characteristic and, small in coercive force (that is, the second and third magnetic layers can be magnetized even by a small external magnetic field $H_E$).

Figure 4:
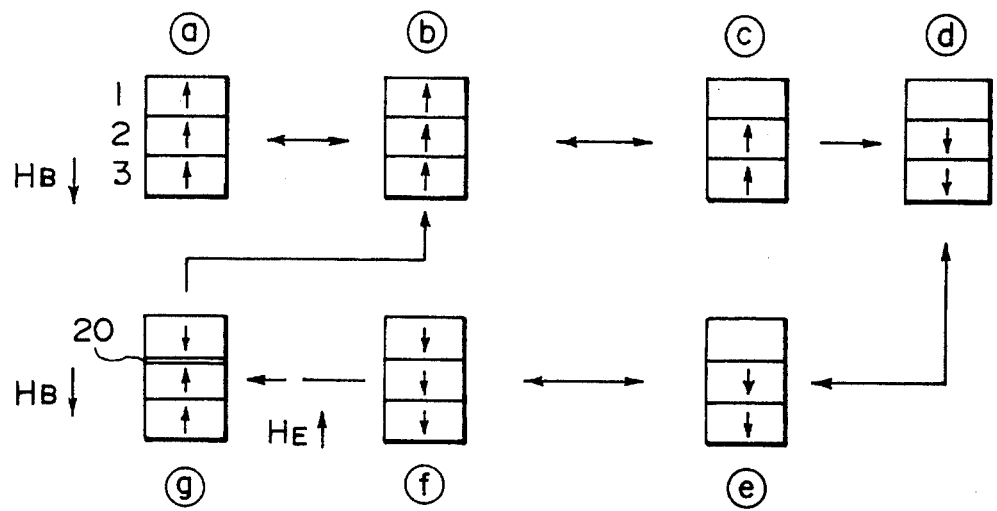
Figure 5:
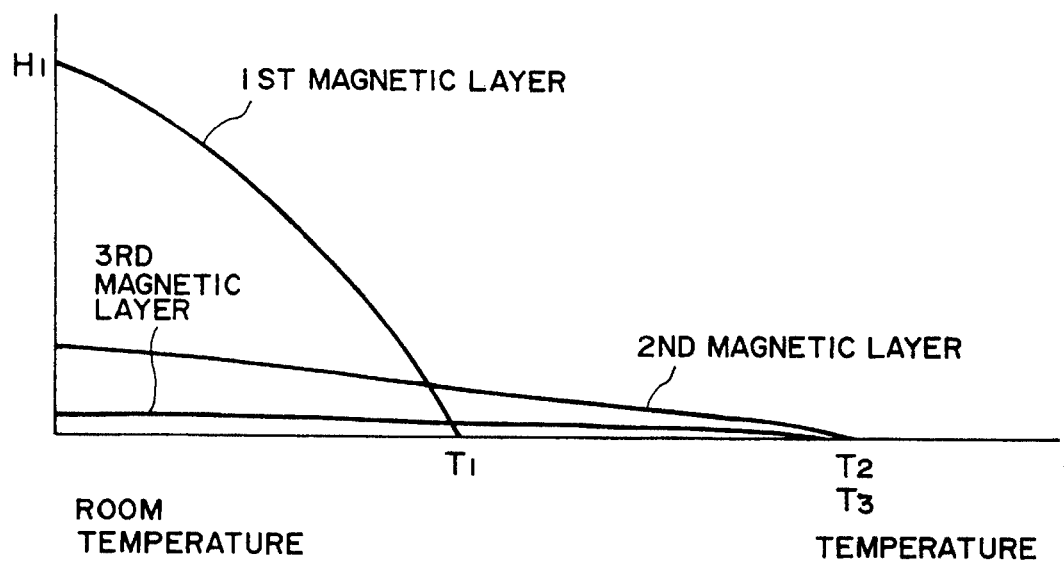

Reference is now made to FIGS. 4 and 5 to describe a recording method in a magneto-optical recording medium in which each layer has no compensation point.

The example shown in FIG. 4 shows a case where all of the first to third magnetic layers are rare earth-iron group amorphous alloy thin films in which iron group sub-lattice magnetization is dominant. In this case, by virtue of the exchange coaction between the layers, the magnetizations of the first to third magnetic layers are stable in a state in which all of them are parallel to one another. That is, the magnetized state ⓐ is the most stable state. On the other hand, the stage ⓖ is unstable as compared with the state ⓐ, and as shown, there exists an interface magnetic wall 20.

FIG. 5 illustratively shows the relation between the coercive force and temperature of each magnetic layer in this case.

When the temperature of this magneto-optical recording medium is raised to the vicinity of $T_1$ shown in FIG. 5, that portion of the medium which is in the magnetized state ⓖ changes to the state ⓑ. This is because the coercive force $H_1$ of the first magnetic layer is reduced with the temperature rise and reverses upwardly under the influence of the exchange force by the second and third magnetic layers. When the temperature is lowered from this state, the medium becomes cool and shifts to the state ⓐ with the magnetized state remaining unchanged. Also, even if the temperature is raised from the state ⓐ and is lowered after the medium assumes the state ⓑ, the medium returns to the state ⓐ.

That is, by the application of laser power for raising the temperature of the magnetic layers to the vicinity of $T_1$, both of the states ⓐ and ⓖ in the medium can be changed to the state ⓐ.

On the other hand, when the temperature of the magnetic layers is further raised from the state ⓑ and is brought to the vicinity of the curie point $T_1$ of the first magnetic layer, the magnetization of the first magnetic layer disappears and the medium assumes the state ⓒ. When the temperature is further raised, the coercive forces of the second and third magnetic layers become smaller and the magnetization of the second and third magnetic layers is inverted by the bias magnetic field $H_B$ and the medium assumes the state ⓓ.

When the temperature is lowered from this state, the medium becomes cool and assumes the state ⓔ with the magnetized state remaining unchanged. When the temperature is further lowered, the magnetization of the first magnetic layer occurs downwardly at the vicinity of $T_1$ by virtue of the exchange coaction and the medium assumes the state ⓕ. When the temperature is further lowered to room temperature, the coercive force of the first magnetic layer becomes great as compared with the coercive forces of the second and third magnetic layers. If hereupon, the external magnetic field $H_E$ is applied, the magnetization of the second and third magnetic layers will be upwardly inverted and the medium will assume the state ⓖ.

That is, by the application of laser power for raising the temperature of the magnetic layers to the vicinity of $T_2$ (and the application of the external magnetic field $H_E$), both of the state ⓐ and the state ⓖ shift to the state ⓖ. By such a recording method, as by the recording method previously described with reference to FIGS. 2 and 3, desired overwriting can be accomplished. Again in this recording method, a downward bias magnetic field $H_B$ intended to assist recording is applied in the recording head portion and an upward external magnetic field $H_E$ of a magnitude sufficient to magnetize the second and third magnetic layers in one direction and not inverting the direction of magnetization of the first magnetic layer is applied at a position differing from the recording head. Here, $H_B$ is smaller than $H_E$.

The present invention will hereinafter be described in greater detail with respect to some examples thereof.

EXAMPLE 1

In a sputtering apparatus provided with eight target sources, a disk-like substrate made of polycarbonate and formed with pregroove and preformat signals was set at an interval of 20 cm from the target and was rotated. In argon, a target of $Si_3N_4$ was used to provide $Si_3N_4$ as a protective layer having a thickness of 600 Å at a sputtering speed of about 40 Å/min. and sputtering pressure of 0.15 Pa.

Subsequently, in argon, three targets of Tb, Fe and Co were used to form a first magnetic layer of Tb-$(Fe_{0.96}Co_{0.04})$ having a film thickness of 360 Å, a coercive force $H_1$ of about 20 KOe, a curie point $T_1$ of about 160° C. and saturated magnetization of 40 emu/cc and in which Fe—Co sub-lattice magnetization was dominant, at a sputtering speed of about 100 A/min. and sputtering pressure of 0.15 Pa. The adjustment of the composition of Tb—Fe—Co was carried out with the electric power applied to the respective targets being varied.

Next, in argon, two targets of $Gd_{0.5}Dy_{0.5}$ and $Fe_{0.6}Co_{0.4}$ were used to form a second magnetic layer of $(Gd_{0.5}Dy_{0.5})$–$(Fe_{0.6}Co_{0.4})$ having a film thickness of 500 Å, a coercive force $H_2$ of about 4 KOe, a curie point $T_2$ of about 280° C., a compensation temperature $T_{comp}$ of about 140° C. and saturated magnetization of about 100 emu/cc and in which Gd—Dy sub-lattice magnetization was dominant, at a sputtering speed of about 100 Å/min. and sputtering pressure of 0.15 Pa.

Subsequently, in argon, two targets of $Gd_{0.5}Ho_{0.5}$ and $Fe_{0.6}Co_{0.4}$ were used to form a third magnetic layer of $(Gd_{0.5}Ho_{0.5})$—$(Fe_{0.6}Co_{0.4})$ having a film thickness of 1500 Å, a curie point $T_3$ of about 180° C., a coercive force H of about 0.5 KOe and saturated magnetization of 150 emu/cc and in which Gd—Ho sub-lattice magnification was dominant, at a sputtering speed of about 100 Å/min. and sputtering pressure of 0.15 Pa. In the third magnetic layer, the compensation temperature was not observed.

Finally, in argon, a target of $Si_3N_4$ was used to provide a protective layer of $So_3N_4$ having a thickness of 600 Å, at a sputtering speed of about 40 Å/min. and sputtering pressure of 0.15 Pa.

Subsequently, film formation was completed by cementing the layered magnetic films to a substrate of polycarbonate by the use of a hot-melt adhesive agent, whereby a magneto-optical recording medium was made. The magnetic field (i.e., $H_E$) necessary for inverting the magnetization of the second and third magnetic layers at a time with these two layers laminated one upon the other was 2 KOe.

This magneto-optical recording medium was set in a recording-reproducing apparatus and recording was effected by laser power of two values, 5 mW and 12 mW, while a bias magnetic field $H_E$ of 400 Oe and an external magnetic field $H_E$ of 2 KOe were applied to the medium and a laser beam of wavelength 830 nm condensed into about 1.5 μm at a line speed of about 8.5 m/sec. was modulated at a duty of 50% and 1 MHz.

Subsequently, after said recording was effected, recording by the same power was effected at 3 MHz on the same track. The reproduction of the recorded signal was effected with a continuous beam of 1 mW applied to the medium.

COMPARATIVE EXAMPLE 1

A magneto-optical recording medium similar to that of Example 1 was made with the exception that the thickness of the second magnetic layer $(Gd_{0.5}Dy_{0.5})$—$(Fe_{0.6}Co_{0.4})$ was 2000 Å and the third magnetic layer was not provided, and recording and reproduction similar to Example 1 were effected with the exception that an external magnetic field $H_E$ of 4 KOe was applied. The magnetic field (i.e., $H_E$) necessary for inverting the magnetization of the second magnetic layer was about 4 KOe.

The results of the recording of Example 1 and Comparative Example 1 are shown in Table 4 below. The erase ratio in Table 4 is the erase ratio of the reproduction signal of 1 MHz when overwriting was effected at 3 MHz after recording was effected at 1 MHz.

TABLE 4

| Recording frequency 1 MHz | Example 1 | Comp. Example 1 |
|---|---|---|
| Carrier | 0 dBm | 0 dBm |
| Noise | −55 dBm | −55 dBm |
| Erase ratio | −50 dB | −50 dB |
| External magnetic field ($H_E$) | 2 KOe | 4 KOe |

As is apparent from the results shown in Table 4, the magneto-optical recording medium of Example 1 can present an equal recording characteristic even by a low external magnetic field (2 KOe), as compared with the magneto-optical recording medium of Comparative Example 1 which requires a high external magnetic field (4 KOe).

EXAMPLE 2 AND COMPARATIVE EXAMPLE 2

A magneto-optical recording medium was made in a manner similar to Example 1 with the exception that the material compositions and film thicknesses of the second magnetic layer and the third magnetic layer were changed as shown in Table 5, and recording similar to Example 1 was effected. However, in both of the second magnetic layer and third magnetic layer, the sub-lattice magnetization of rare earth elements was dominant.

TABLE 5

| | Second Magnetic layer | | | | | Third Magnetic layer | | | | | Recording frequency 1 MHz | |
|---|---|---|---|---|---|---|---|---|---|---|---|---|
| | Composition | Film thickness | Compensation temp. | $T_2$ | $H_2$ | Composition | Film thickness | $T_3$ | $H_3$ | Necessary $H_B$ | Carrier | Noise |
| Example 2-1 | Tb—(Fe$_{0.7}$ Co$_{0.3}$) | 500Å | 150° C. | 250° C. | 5 kOe | (Gd$_{0.5}$ Ho$_{0.5}$)—(Fe$_6$ Co$_{0.4}$) | 1500Å | 180° C. | 0.5 kOe | 2.6 kOe | 0 | −57 |
| Example 2-2 | " | " | " | " | " | " | 500Å | " | " | 3.0 kOe | 0 | −57 |
| Example 2-3 | " | " | " | " | " | " | 250Å | " | " | 4.5 kOe | 0 | −57 |
| Example 2-4 | " | " | " | " | " | " | 500Å | " | " | 1.5 kOe | 0 | −50 |
| Example 2-5 | " | " | " | " | " | " | 600Å | " | " | 0.9 kOe | 0 | −46 |
| Comp. Example 2 | " | not provided | | | | " | 800Å | " | " | 0.5 kOe | −20 | −35 |
| Example 2-6 | Dy—(Fe$_{0.6}$ Co$_{0.4}$) | 500Å | 190° C. | 240° C. | 4 kOe | (Gd$_{0.5}$ Ho$_{0.5}$)—(Fe$_{0.6}$ Co$_{0.4}$) | 1500Å | 180° C. | 0.5 kOe | 2.0 kOe | 0 | −56 |
| Example 2-7 | " | 300Å | " | " | " | " | 400Å | " | " | 1.2 kOe | 0 | −55 |
| Example 2-8 | " | 200Å | " | " | " | " | 500Å | " | " | 0.8 kOe | 0 | −50 |
| Example 2-9 | (Tb$_{0.5}$ Dy$_{0.5}$)—(Fe$_{0.7}$ Co$_{0.3}$) | 500Å | 170° C. | 250° C. | 4.5 kOe | " | 1500Å | " | " | 2.2 kOe | 0 | −57 |
| Example 2-10 | (Tb$_{0.75}$ Gd$_{0.25}$)—(Fe$_{0.7}$ Co$_{0.3}$) | 500Å | 130° C. | 270° C. | 3.5 kOe | " | " | " | " | 1.5 kOe | 0 | −52 |
| Example 2-11 | (Tb$_{0.5}$ Gd$_{0.5}$)—(Fe$_{0.7}$ Co$_{0.3}$) | 500Å | 110° C. | 290° C. | 3.0 kOe | " | " | " | " | 1.2 kOe | 0 | −50 |
| Example 2-12 | (Tb$_{0.25}$ Gd$_{0.75}$)—(Fe$_{0.7}$ Co$_{0.3}$) | 500Å | 90° C. | 310° C. | 2.2 kOe | " | " | " | " | 0.8 kOe | 0 | −38 |
| Example 2-13 | (Dy$_{0.75}$ Gd$_{0.25}$)—(Fe$_{0.6}$ Co$_{0.4}$) | 500Å | 170° C. | 260° C. | 3.0 kOe | " | " | " | " | 1.2 kOe | 0 | −51 |
| Example 2-14 | (Dy$_{0.5}$ Gd$_{0.5}$)—(Fe$_{0.6}$ Co$_{0.4}$) | 500Å | 140° C. | 280° C. | 2.2 kOe | " | " | " | " | 0.9 kOe | 0 | −48 |
| Example 2-15 | (Dy$_{0.25}$ Gd$_{0.75}$)—(Fe$_{0.6}$ Co$_{0.4}$) | 500Å | 110° C. | 310° C. | 1.8 kOe | " | " | " | " | 0.7 kOe | 0 | −32 |
| Example 2-16 | Tb—(Fe$_{0.7}$ Co$_{0.3}$) | 500Å | 150° C. | 250° C. | 5 kOe | Tb—(Fe$_{0.8}$ Co$_{0.2}$) | 1000Å | 180° C. | 1.0 kOe | 3.5 kOe | 0 | −57 |
| Example 2-17 | " | " | " | " | " | " | " | 170° C. | 0.5 kOe | 3.5 kOe | 0 | −55 |
| Example 2-18 | " | " | " | " | " | " | " | 150° C. | 0.2 kOe | 4.0 kOe | −10 | −45 |
| Example 2-19 | " | " | " | " | " | (Tb$_{0.75}$ Gd$_{0.25}$)—(Fe$_{0.8}$ Co$_{0.2}$) | " | 190° C. | 0.7 kOe | 3.3 kOe | 0 | −57 |
| Example 2-20 | " | " | " | " | " | " | " | 160° C. | 0.5 kOe | 2.2 kOe | 0 | −57 |
| Example 2-21 | " | " | " | " | " | " | " | 150° C. | 0.2 kOe | 2.1 kOe | 0 | −51 |
| Example 2-22 | " | " | " | " | " | (Tb$_{0.5}$ Gd$_{0.5}$)—(Fe$_{0.8}$ Co$_{0.2}$) | " | 190° C. | 0.7 kOe | 3.2 kOe | 0 | −57 |
| Example 2-23 | " | " | " | " | " | " | " | 180° C. | 0.5 kOe | 2.6 kOe | 0 | −57 |
| Example 2-24 | " | " | " | " | " | (Tb$_{0.25}$ Gd$_{0.75}$)—(Fe$_{0.8}$ Co$_{0.2}$) | " | 180° C. | 0.2 kOe | 2.0 kOe | 0 | −57 |
| Example 2-25 | " | " | " | " | " | " | " | 200° C. | 0.5 kOe | 1.8 kOe | 0 | −57 |
| Example 2-26 | " | " | " | " | " | " | " | 220° C. | 0.2 kOe | 1.6 kOe | 0 | −57 |
| Example 2-27 | " | " | " | " | " | (Gd)—(Fe$_{0.8}$ Co$_{0.2}$) | " | 240° C. | 0.1 kOe | 1.5 kOe | 0 | −57 |
| Example 2-28 | " | " | " | " | " | " | " | 260° C. | 0.2 kOe | 1.6 kOe | 0 | −57 |
| Example 2-29 | " | " | " | " | " | " | " | 230° C. | 0.1 kOe | 1.3 kOe | 0 | −57 |
| Example 2-30 | Dy—(Fe$_{0.5}$ Co$_{0.5}$) | 300Å | 170° C. | 280° C. | 3.0 kOe | (Tb$_{0.5}$ Dy$_{0.5}$)—(Fe$_{0.75}$ Co$_{0.25}$) | 700Å | 160° C. | 0.5 kOe | 2.5 kOe | 0 | −56 |
| Example 2-31 | " | " | " | " | " | (Tb$_{0.3}$ Dy$_{0.3}$ Ho$_{0.4}$)—(Fe$_{0.75}$ Co$_{0.25}$) | " | 120° C. | 0.4 kOe | 1.5 kOe | 0 | −56 |
| Example 2-32 | " | " | " | " | " | (Tb$_{0.3}$ Dy$_{0.3}$ Gd$_{0.4}$)—(Fe$_{0.75}$ Co$_{0.25}$) | " | 190° C. | 0.4 kOe | 1.5 kOe | 0 | −56 |

As is apparent from the results shown in Table 5, the magneto-optical recording medium of each Example is low in the value of the necessary external magnetic field $H_E$, as compared with the magneto-optical recording medium of Comparative Example 2.

Also, with regard to the preferable composition and film thickness of the second magnetic layer, it can be seen that it is preferable to provide Tb—(FeCo)

[Examples 2-1 to 2-5 and Examples 2-16 to 2-29]

Dy—(FeCo)

[Examples 2-6 to 2-8 and Examples 2-30 to 2-32]

(Tb—Dy)—(FeCo)

[Example 2-9]
at a film thickness greater than 150–200 Å, because a good C/N ratio is provided thereby.

It can also be seen from the results of Examples 2-10 to 2-15 that it is preferable that the addition of elements such as Gd and Ho for reducing the vertical magnetic anisotropy be up to the order of in rare earth elements in order not to decrease the recording noise.

With regard to the preferable composition and film thickness of the third magnetic layer, it can be seen that it is preferable to provide (Gd—Ho)—(FeCo)

[Examples 2-1 to 2-15]

Gd—(FeCo)

[Examples 2-28 to 2-29 ]
at a film thickness greater than 400–500 Å and equal to or greater than the film thickness of the second magnetic layer, because a better reducing effect of the external magnetic field $H_E$ is provided thereby.

It can also be seen that when use is made of Tb—(FeCo) [Examples 2-16 to 2-18] and (Tb—Dy)—(FeCo) [Example 2-30] which are great in vertical magnetic anisotropy, the resultant recording medium exhibits a good recording characteristic (low recording noise), but is somewhat inferior in the reducing effect of the external magnetic field $H_E$. This is because to make the coercive force of the Tb—(FeCo) film small, the saturated magnetization of this film must be set to a great value as compared with that of the Gd or Ho—(FeCo) film and such film is small in the magnetic field at which the inversion of magnetization begins, but is rather increased in the magnetic field necessary for orienting the magnetization in one direction until it is saturated. For example, in Example 2-18, a magnetic field of about 4 KOe was necessary to saturate the magnetization of the third magnetic layer Tb—(FeCo).

Also, the system (Examples 2-19 to 2-27) in which Gd was added to Tb—(FeCo) or the system (Examples 2-31 to 2-32) in which Ho or Gd was added to (Tb—Dy)—(FeCo) exhibits a remarkable reducing effect of the external magnetic field $H_E$ if the elements Gd and Ho each exceed 50% in the rare earth elements. This is because the magnetization of the third magnetic layer becomes saturable by a small external magnetic field $H_E$ with the aid of the addition of elements such as Ho and Gd which are small in vertical magnetic anisotropy.

EXAMPLE 3

A disk-like substrate made of polycarbonate and formed with pregroove and preformat signals was set in a sputtering apparatus provided with eight target sources, at a distance of 20 cm from the target, and was rotated. In argon, a target of $Si_3N_4$ was used to provide a protective layer of ZnS having a thickness of 600 Å at a sputtering speed of about 40 Å/min. and sputtering pressure of 0.15 Pa. Subsequently, in argon, three targets of Gd, Fe and Co were used to form a magnetic layer of Gd—($Fe_{0.7}Co_{0.3}$) having a film thickness of 250 Å, a coercive force H of about 0.2 KOe, a curie point of about 330° C. and saturated magnetization of 100 emu/cc and in which Fe—Co sub-lattice magnetization was dominant, at a sputtering speed of about 100 Å/min. and sputtering pressure of 0.15 Pa. The adjustment of the composition of Gd—Fe—Co was effected by varying electric power applied to the respective targets of Gd, Fe and Co.

Subsequently, in argon, three targets of Dy, Fe and Co were used to form a first magnetic layer of Dy—($Fe_{0.85}Co_{0.15}$) having a film thickness of 300 Å, a coercive force $H_1$ of about 20 KOe, a curie point $T_1$ of about 170° C. and saturated magnetization of 30 emu/cc and in which Fe—Co sub-lattice magnetization was dominant, at a sputtering speed of about 100 Å/min. and sputtering pressure of 0.15 Pa.

Next, in argon, two targets of $Gd_{0.5}Dy_{0.5}$ and $Fe_{0.6}Co_{0.4}$ were used to form a magnetic layer of (Gd—Dy)—(FeCo) having a film thickness of 200 Å, a coercive force of about 0.2 KOe or less, a curie point of about 190° C. and saturated magnetization of 450 emu/cc and in which Gd—Dy sub-lattice magnetization was dominant, at a sputtering speed of about 100 Å/min. and sputtering pressure of 0.15 Pa.

Subsequently, in argon, two targets of $Gd_{0.75}Tb_{0.25}$ and $Fe_{0.7}Co_{0.3}$ were used to form a second magnetic layer of (Dy—Tb)—(FeCo) having a film thickness of 300 Å, a coercive force $H_2$ of about 3.5 KOe, a curie point $T_2$ of about 230° C. and saturated magnetization of 90 emu/cc and in which Fe—Co sub-lattice magnetization was dominant, at a sputtering speed of about 100 Å/min. and sputtering pressure of 0.15 Pa.

Subsequently, in argon, two targets of Gd and $Fe_{0.6}Co_{0.4}$ were used to form a third magnetic layer of Gd—(FeCo) having a film thickness of 400 Å, a coercive force of 0.5 KOe, a curie point of about 300° C. and saturated magnetization of 110 emu/cc and in which Fe—Co sub-lattice magnetization was dominant, at a sputtering speed of about 100 Å/min. and sputtering pressure of 0.15 Pa.

Finally, in argon, a target of $Si_3N_4$ was used to provide a protective layer of $Si_3N_4$ having a thickness of 600 Å, at a sputtering speed of about 40 Å/min. and sputtering pressure of 0.15 PA.

Subsequently, film formation was completed by cementing the layered magnetic films to a substrate of polycarbonate by use of a hot-melt adhesive agent, whereby a magneto-optical recording medium was made.

The magnetic field (i.e., $H_E$) necessary for inverting the magnetization of the second and third magnetic layers at a time with these two layers laminated one upon the other was 2 KOe.

In the present example, the magnetic layer of Gd—($Fe_{0.7}Co_{0.3}$) provided on the side nearest to the substrate is a layer which is great in the magneto-optical effect (the Kerr rotation angle) as compared with the first magnetic layer, and it is strongly coupled to the first magnetic layer at room temperature by the exchange coupling force and therefore, the inversion of magnetization did not occur even for an applied magnetic field of 15 KOe.

The (Gd—Dy)—(FeCo) layer dominant in rare earth element sub-lattice magnetization which is provided between the first magnetic layer and the second magnetic layer is great in saturated magnetization and is magnetization-saturated in a direction perpendicular to the surface of the substrate in a single-layer film and therefore, the interior of the surface of the substrate in which a magnetic field of about 3 KOe is necessary is the direction in which magnetization is easy. This layer acts to suppress the exchange coupling force which works between the first and second magnetic layers at room temperature.

Subsequently, this magneto-optical recording medium was set in a recording-reproducing apparatus and recording similar to that in Example 1 was carried out. However, the external magnetic field of 2 KOe and the bias magnetic field $H_B$ of 400 Oe are opposite to each other in the direction of application.

EXAMPLE 4

A magneto-optical recording medium was made in a manner similar to Example 3 with the exception that the material compositions and film thicknesses of the second and third magnetic layers were changed, and similar recording was carried out. However it is to be understood that the external magnetic field and the bias magnetic field were applied in the same direction when the second or third magnetic layer had a compensation temperature between room temperature and the curie point, and were applied in opposite directions when the second or third magnetic layer did not have a compensation temperature.

The results of Example 3 and Example 4 are shown Table 6 blow.

Comparing Example 3 and Example 4-1 with each other, it can be seen that in the second magnetic layer which is in contact with the first magnetic layer, (Dy—Tb)—(FeCo) composition greater in vertical magnetic anisotropy results in smaller recording noise than Gd—(FeCo) composition. It can also be seen that even when the same Gd—(FeCo) magnetic layer is used, the recording noise can be reduced by using it within a composition range having a compensation temperature as in Example 4-2 or Example 4-3. This is partly because the external magnetic field $H_E$ and the bias magnetic field $H_B$ are in the same direction and the magnetization of the second and third magnetic layers can be stabilized during recording.

Also, in the vicinity of the compensation temperature, the coercive forces of the magnetic layers become greater and it becomes difficult for the inversion of magnetization to occur. The Gd—Fe—Co magnetic layer is small in magnetic anisotropy and generally exhibits a small coercive force. However, if two layers relatively approximate to each other in compensation temperature are laminated as in the examples, the coercive force will be stabilized in a relatively wide temperature range including these two compensation temperatures, by the exchange coupling force of the two layers, and it will become difficult for the inversion of magnetization to occur. These effects are considered to result in the effect that the Gd—Fe—Co laminated films exhibit the nature of magnetic film great in magnetic anisotropy and reduce the recording noise.

Also, in the present embodiment, either of the second and third magnetic layers may be adjacent to the first magnetic layer. That is, either of them may be laminated earlier. In Table 6, for the sake of convenience, the second magnetic layer and the third magnetic layer are so named in order of lamination and therefore, in Examples 4-1 and 4-3, the third magnetic layer is greater in coercive force, but in this case,

TABLE 6

| | 2nd Magnetic layer | | | | | 3rd Magnetic layer | | | | | Recording frequency 1 MHz | | |
|---|---|---|---|---|---|---|---|---|---|---|---|---|---|
| | Composition | Film thickness | Composition temp. | $T_2$ | $H_2$ | Composition | Film thickness | Composition temp. | $T_3$ | $H_3$ | Necessary $H_E$ | Carrier | Noise |
| Example 3 | (Dy—Tb)—(FeCo) | 300Å | no | 230° C. | 3.5 kOe | Gd—(FeCo) | 400Å | no | 300° C. | 0.5 kOe | 2.0 kOe | 3 | −53 |
| Example 4-1 | Gd—(FeCo) | 400Å | no | 300° C. | 0.5 kOe | (Dy—Tb)—(FeCo) | 300Å | no | 230° C. | 3.5 kOe | 3.0 kOe | 3 | −42 |
| Example 4-2 | Gd—(FeCo) | 300Å | 90° C. | 280° C. | 1.5 kOe | Gd—(FeCo) | 400Å | 150° C. | 240° C. | 0.5 kOe | 1.1 kOe | 3 | −48 |
| Example 4-3 | Gd—(FeCo) | 400Å | 150° C. | 240° C. | 0.5 kOe | Gd—(FeCo) | 300Å | 90° C. | 280° C. | 1.5 kOe | 1.4 kOe | 2 | −46 |
| Example 4-4 | (Dy—Tb)—(FeCo) | 300Å | 150° C. | 240° C. | 3.0 kOe | Gd—(FeCo) | 400Å | no | 300° C. | 0.5 kOe | 2.0 kOe | 3 | −57 |
| Example 4-5 | (Dy—Tb)—(FeCo) | " | no | 200° C. | 2.0 kOe | Gd—(FeCo) | 400Å | 150° C. | 240° C. | 0.5 kOe | 1.5 kOe | 3 | −55 |

As is apparent from the results shown in Table 6, there is the effect of reducing the necessary external magnetic field $H_E$ for all of the present examples. It can also be seen that the provision of the Gd—Fe—Co magnetic layer having a great magneto-optical effect improves the carrier level of the reproduction signal by about 3 dBm.

In Table 6, those of the second and third magnetic layers which have a compensation temperature were all dominant in rare earth sub-lattice magnetization, and those which have no compensation temperature were all dominant in iron group metal sub-lattice magnetization.

the third magnetic layer in this table means the second magnetic layer referred to in the present invention. Comparing Examples 4-1 and 4-3 with Examples 3, 4-2, 4-4 and 4-5, it can be seen that the latter is more remarkable in the effect of reducing the necessary external magnetic field.

As has been described above, the magneto-optical recording medium of the present invention enables good overwriting achievable even if the external magnetic field is relatively small, and can make possible both the prevention of the disappearance of recording bits and a more compact recording apparatus due to the reduction in the external magnetic field.

Also, if the medium has a composition in which the rare earth element components of the second magnetic layer are chiefly Tb and Dy and the rare earth element components of the third magnetic layer are chiefly Gd and Ho, recording noise will become less and better recording will be ensured.

What is claimed is:

1. A magneto-optical recording medium capable of overwriting by light modulation, comprising:

a substrate;

a recording magnetic layer having a curie temperature $T_1$ and a coercive force $H_1$;

an initializing magnetic layer having a curie temperature $T_2$ and a coercive force $H_2$, said recording and initializing magnetic layers being successively laminated on said substrate, wherein said recording magnetic layer and said initializing magnetic layer satisfy the relation:

$$H_1 > H_2 > \frac{\delta w}{2Msh},$$

where $\delta w$ is the magnetic wall energy between said recording magnetic layer and said initializing magnetic layer, Ms is the saturated magnetization of said initializing magnetic layer and h is the film thickness of said initializing magnetic layer; and an additional magnetic layer, having a curie temperature $T_3$, and a coercive force $H_3$, laminated on the side of said initializing magnetic layer that is opposite said recording magnetic layer, said recording magnetic layer, said initializing magnetic layer and said additional magnetic layer each being a vertically magnetized film comprising of an amorphous alloy of rare earth elements and transition metal elements, and satisfying the following conditions:

$$H_1 > H_2 > H_3,$$

and $$T_1 < T_2 \text{ and } T_3.$$

2. A magneto-optical recording medium according to claim 1, wherein at least one of said initializing magnetic layer and said additional magnetic layer has a compensation temperature between room temperature and the layer's curie temperature.

3. A magneto-optical recording medium according to claim 1, wherein the rare earth elements contained in said initializing magnetic layer include at least one of Tb and Dy, and the rare earth elements contained in said additional magnetic layer include at least one of Gd and Ho.

4. A magneto-optical recording medium according to claim 3, wherein said initializing magnetic layer comprises one of Tb—Fe, Tb—Dy—Fe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co, and Gd—Dy—Fe—Co.

5. A magneto-optical recording medium according to claim 3, wherein said additional magnetic layer comprises one of Gd—Tb—Fe, Gd—Tb—Dy—Fe, Gd—Dy—Fe, Ho—Gd—Fe, Gd—Tb—Fe—Co, Gd—Tb—Dy—Fe—Co, Gd—Dy—Fe—Co, and Ho—Gd—Fe—Co.

6. A magneto-optical recording medium according to claim 4, wherein said recording magnetic layer comprises one of Tb—Fe, Tb—Dy—Fe, Dy—Fe, Tb—Fe—Co, Tb—Dy—Fe—Co, and Dy—Fe—Co.

7. A magneto-optical recording medium according to claim 4, wherein the film thickness of said initializing magnetic layer is approximately 200 Å–2000 Å.

8. A magneto-optical recording medium according to claim 5, wherein the film thickness of said additional magnetic layer is approximately 200 Å–2000 Å.

9. A magneto-optical recording medium according to claim 6, wherein the film thickness of said recording magnetic layer is approximately 200 Å–2000 Å.

10. A magneto-optical recording medium according to claim 1, wherein the curie point $T_1$ of said recording magnetic layer is approximately 70°–250° C., the curie point $T_2$ of said initializing magnetic layer is approximately 100°–400° C., and the curie point $T_3$ of said additional magnetic layer is approximately 100°–400° C.

11. A magneto-optical recording medium according to claim 1, wherein the coercive force $H_1$ of said recording magnetic layer is 5 KOe or more, the coercive force $H_2$ of said initializing magnetic layer is approximately 0.3–5 KOe, and the coercive force $H_3$ of said additional magnetic layer is approximately 0.1–5 KOe.

12. A magneto-optical recording medium according to claim 1, wherein recording pits are formed in said recording magnetic layer.

13. A magneto-optical recording medium according to claim 1, wherein said recording magnetic layer and said initializing magnetic layer are exchange-coupled to each other, and said initializing magnetic layer and said additional magnetic layer are exchange-coupled to each other.

14. A magneto-optical recording medium according to claim 13, wherein a magnetic layer for adjusting and controlling the exchange coupling between said recording magnetic layer and said initializing magnetic layer is provided between said recording magnetic layer and said initializing magnetic layer.

15. A magneto-optical recording medium according to claim 12, wherein the reproduction of recorded information from said medium is effected by the use of the magnetic Kerr effect produced when a laser beam is applied to said recording magnetic layer.

16. A magneto-optical recording medium according to claim 1, wherein said magnetic layers are protected by protective film.

17. A magneto-optical recording medium according to claim 16, wherein said protective film is $Si_3N_4$.

18. A magneto-optical recording medium according to claim 5, wherein said recording magnetic layer comprises one of Tb—Fe, Tb—Dy—Fe, Dy—Fe, Tb—Fe—Co, Tb—Dy—Fe—Co, and Dy—Fe—Co.

19. A magneto-optical recording medium according to claim 18, wherein the film thickness of said recording magnetic layer is 200 Å–1000 Å.

20. A magneto-optical recording medium capable of overwriting by light modulation, comprising:

a substrate;

a recording magnetic layer having a curie temperature $T_1$ and a coercive force $H_1$;

an initializing magnetic layer having a curie temperature $T_2$ and a coercive force $H_2$, said recording and initializing magnetic layers being successively laminated on said substrate, wherein said recording magnetic layer and said initializing magnetic layer satisfy the relation:

$$H_1 > H_2 > \frac{\delta w}{2Msh},$$

where $\delta w$ is the magnetic wall energy between said recording magnetic layer and said initializing magnetic layer, Ms is the saturated magnetization of said initializing magnetic layer and h is the film thickness of said initializing magnetic layer; and an additional magnetic layer, having a curie temperature $T_3$ and a coercive force $H_3$, laminated on the side of said initializing magnetic layer that is opposite said recording magnetic layer, said recording magnetic layer, said initializing magnetic layer and said additional magnetic layer each being a vertically magnetized film comprising an amorphous alloy of rare earth elements and transition metal elements, and satisfying the following conditions:

$H_1 > H_2 > H_3$, and $T_3 < T_1 < T_2$.

* * * * *

UNITED STATES PATENT AND TRADEMARK OFFICE
CERTIFICATE OF CORRECTION

PATENT NO. : 5,536,570     Page 1 of 2
DATED : July 16, 1996
INVENTOR(S) : YOICHI OSATO It is certified that error appears in the above-indentified patent and that said Letters Patent is hereby corrected as shown below:

Column 1

Line 51, "field HB)" should read --field $H_B$)--.

Column 2

Line 29, "being" should read --are--.
Line 60, "showing" should be deleted.

Column 7

Line 17, "no" should be deleted.

Column 8

Line 22, "Applicant" should read --applicant--.

Column 10

Line 24, "field $H_E$" should read --field $H_B$--.

UNITED STATES PATENT AND TRADEMARK OFFICE
CERTIFICATE OF CORRECTION

PATENT NO. : 5,536,570  Page 2 of 2
DATED : July 16, 1996
INVENTOR(S) : YOICHI OSATO It is certified that error appears in the above-indentified patent and that said Letters Patent is hereby corrected as shown below:

Column 15

Line 25, "in" should read --50% in--.

Column 17

Line 34, "shown Table" should read --shown in Table--.
Line 35, "6 blow." should read --6 below.--.

Column 19

Line 34, "of" should be deleted.

Column 20

Line 11, "point" should read --temperature--.
Line 12, "point" should read --temperature--.
Line 14, "point" should read --temperature--.

Signed and Sealed this

Eighteenth Day of February, 1997

Attest:

BRUCE LEHMAN

Attesting Officer    Commissioner of Patents and Trademarks